Sept. 19, 1944.  R. L. RUSSELL  2,358,597
ENGINE SPEED CONTROL
Filed May 8, 1943  2 Sheets-Sheet 1

INVENTOR,
Roland L. Russell.
BY
Victor J. Evans & Co.
ATTORNEYS

Sept. 19, 1944.   R. L. RUSSELL   2,358,597
ENGINE SPEED CONTROL
Filed May 8, 1943   2 Sheets-Sheet 2

Roland L. Russell,
INVENTOR.

BY
Victor J. Evans & Co.
ATTORNEYS

Patented Sept. 19, 1944

2,358,597

UNITED STATES PATENT OFFICE 2,358,597

ENGINE SPEED CONTROL

Roland L. Russell, Cincinnati, Ohio

Application May 8, 1943, Serial No. 486,218

3 Claims. (Cl. 74—526)

My invention relates to automotive vehicles and has among its objects and advantages the provision of an improved speed limiting device which may be easily set by the operator at any desired speed.

Figure 1:
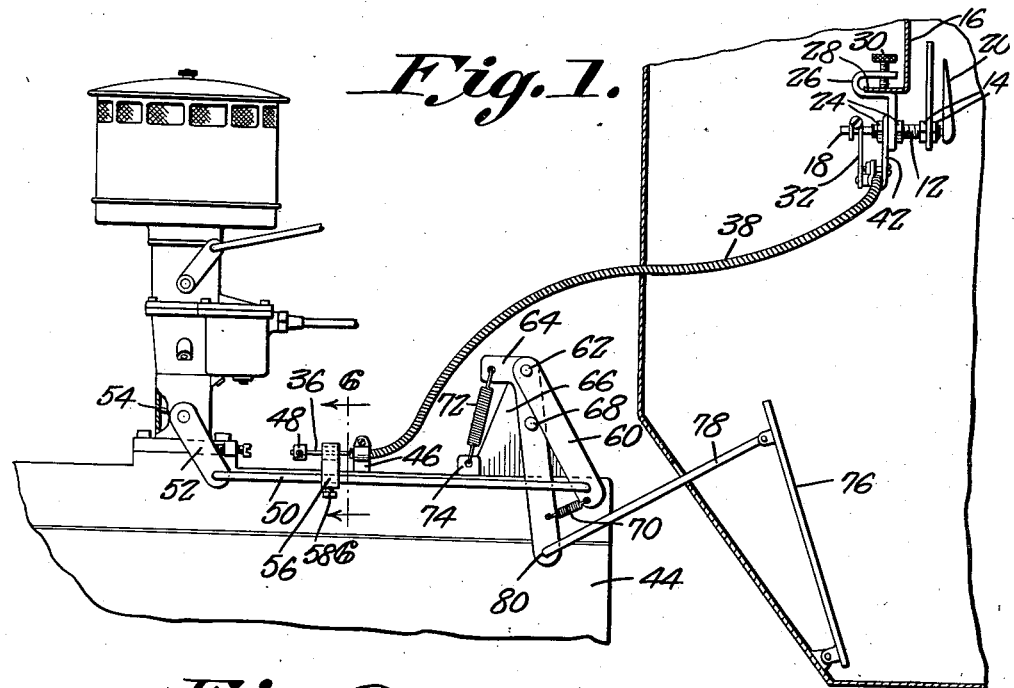
Figure 1 is a fragmentary side elevational view of an engine illustrating my invention applied thereto.

In the embodiment of the invention selected for illustration, I make use of a dial plate 10 which is fixedly attached to an externally threaded sleeve 12. Nuts 14 fixedly clamp the plate to the sleeve. This plate is located close to the instrument panel 16 of the vehicle in view of the operator thereof. A shaft 18 is rotatably but frictionally mounted in the sleeve 12 and is provided with a lever or pointer 20 for coaction with the mileage scale 22 on the plate 10.

Nuts 24 are threaded on the sleeve 12 and fixedly secure the latter to a bracket 26 attached to the flange 28 on the panel 16 through the medium of a set screw 30.

Figures 2, 3:
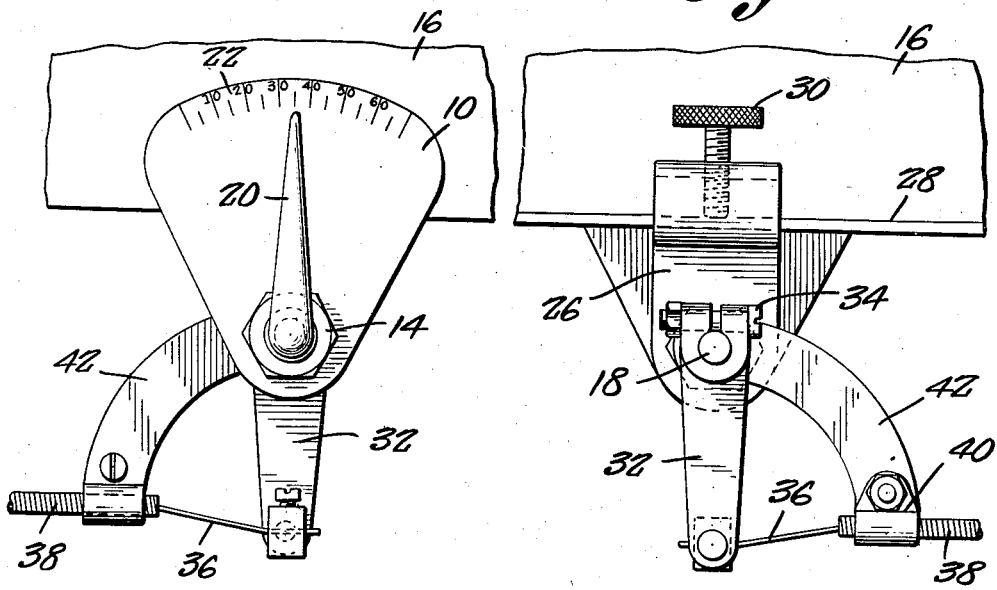
Figure 2 is a face view of the speed dial and setting lever.
Figure 3 is a top view of the structure of Figure 2.
Figure 4:
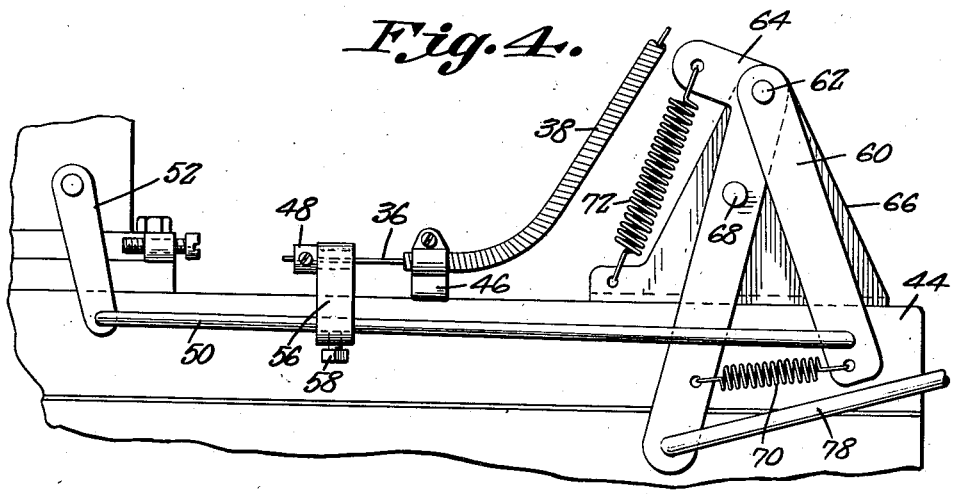
Figure 4 is a view illustrating the speed limiting position of the control.
Figure 5:
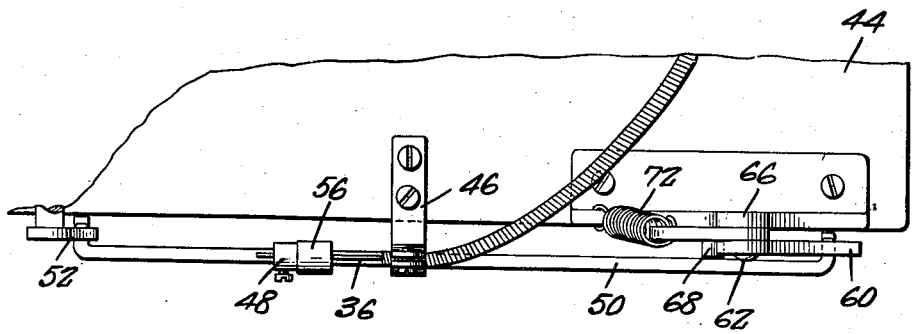
Figure 5 is a top view of the structure of Figure 4.
Figure 6:
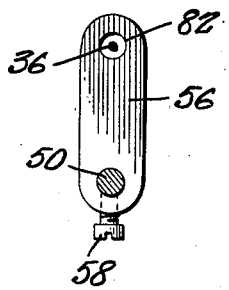
Figure 6 is a view taken along the line 6—6 of Figure 1.

A lever 32 has one end clamped on the shaft 18 as by a bolt 34 in Figure 3. To the outer end of the lever 32 is fixedly attached a wire 36 slidable in a flexible housing 38. One end of the housing is clamped at 40 to one end of a bracket 42 fixedly related to the sleeve 12 by the nuts 24.

On the engine 44 of Figure 1 is mounted a bracket 46 to which the opposite end of the flexible housing 38 is fixedly secured. The wire 36 extends beyond the bracket 46 and is provided with a stop 48. One end of a rigid link 50 is pivotally connected with the usual throttle lever 52 for actuating the throttle valve 54. A stop 56 is attached to the link 50 by a set screw 58, which stop coacts with the stop 48 to limit the distance that the valve 54 may be opened.

The second end of the link 50 is pivotally connected with a link 60 pivotally mounted at 62 on a lever 64. This lever is also pivotally mounted at 62 on a bracket 66 mounted on the engine. A stop 68 is attached to the lever 64 and is normally engaged by the link 60 by reason of a tension spring 70 having one end connected with the lever 64 and its other end connected with the lever 60.

A tension spring 72 has one end connected with one end of the lever 64 and its other end attached to a bracket 74 mounted on the engine. The usual accelerator pedal 76 is connected with a rod 78 pivotally connected at 80 with the lever 64. The pivotal axis is located intermediate the ends of the lever 64 so that the spring 72 yieldingly holds the pedal 76 in its normal position of Figure 1.

The stop 56 is provided with a bore 82 in which the wire 36 moves freely.

In operation, pivotal movement of the lever or pointer 20 imparts longitudinal motion to the wire 36 for adjusting the stop 48 relatively to the stop 56. With the stop 48 positioned in accordance with Figure 1, pressure on the pedal 76 pivots the lever 64 in a clockwise direction against the tension of the spring 72, and the link 60 moves with the lever 64 by reason of the spring 70. However, when the link 50 has been advanced sufficiently far to bring the stop 56 into engagement with the stop 48, further pivotal movement of the link 60 is arrested notwithstanding further pivotal movement of the lever 64. Thus the stop 48 may be set at any desired speed in accordance with the scale 22 to control opening of the valve 54 beyond the set position of the pointer 20.

Without further elaboration, the foregoing will so fully explain my invention, that others may, by applying current knowledge, readily adapt the same for use under various conditions of service.

I claim:

1. In an engine, the combination of a rotary throttle valve having an arm, a throttle valve control comprising a foot operated pedal, a resiliently biased lever mounted for pivotal movement about a fixed axis, means connecting said lever with said foot operated pedal, a first stop on said lever, a pivoted link normally engaging said first stop, a spring connecting said lever and said link to yieldingly hold the latter in engagement with said first stop, a rod connecting said link with said arm, a flexible housing, a wire slidable in said housing and having one end provided with a second stop, a third stop on said rod connecting the link with said arm, a speed indicating scale, a pointer coacting with said scale, a rotatably mounted shaft supporting said pointer, and an operating connection between said shaft and said wire to impart longitudinal movement to the wire through rotation of said pointer for adjusting said second stop relatively to said third stop, said first stop being so arranged as to cause said link to move with said lever until said third stop is brought into engagement with said second stop but permitting further pivotal movement of the link.

2. The combination with a throttle valve having an arm fixed thereto and a pedal for actuating said valve, of a lever mounted to pivot about a fixed horizontal axis and having a projection extending laterally therefrom below the pivot axis, a link connecting the lower end of said lever with the pedal, a spring connecting with the lever to yieldingly hold the same in its retracted throttle closing position, an operating arm mounted to pivot about said axis in a position parallel with the lever, a spring connecting the lower end of the operating arm with the lever to resiliently hold the arm against the projection on the lever, an operating link connecting the lower end of said operating arm with the throttle arm to open the throttle upon forward movement of the operating arm, an abutment adjustably secured on the operating link, and a selectively adjustable stop mounted in the path of movement of said abutment for limiting the throttle opening movement of the operating link.

3. The combination with a throttle valve having an arm fixed thereto and a pedal for actuating said valve, of a lever mounted to pivot about a fixed horizontal axis and having a projection extending laterally therefrom below the pivot axis, a link connecting the lower end of said lever with the pedal, a spring connecting with the lever to yieldingly hold the same in its retracted throttle closing position, an operating arm mounted to pivot about said axis in a position parallel with the lever, a spring connecting the lower end of the operating arm with the lever to resiliently hold the arm against the projection on the lever, an operating link connecting the lower end of said operating arm with the throttle arm to open the throttle upon forward movement of the operating arm, an abutment adjustably secured on the operating link, a stop adjustably mounted in the path of movement of said abutment, and means controlled from a position remote from the stop for adjusting the position of the latter to limit the opening movement of the throttle.

ROLAND L. RUSSELL.